(No Model.) 5 Sheets—Sheet 1.

J. R. MORGAN.
OVERHEAD TRAVELING CRANE.

No. 478,803. Patented July 12, 1892.

Witnesses: Inventor: Jno. R. Morgan.

(No Model.)
5 Sheets—Sheet 4.
J. R. MORGAN.
OVERHEAD TRAVELING CRANE.
No. 478,803.
Patented July 12, 1892.
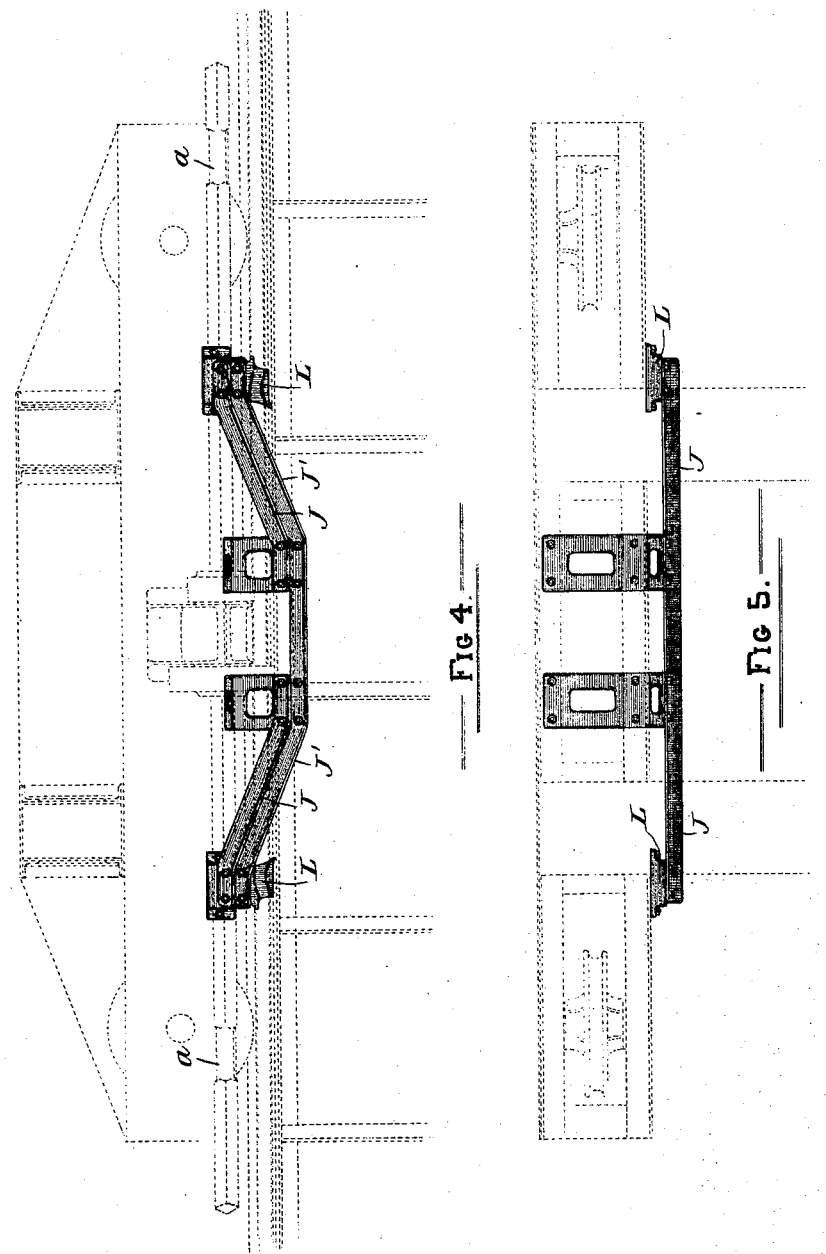

(No Model.) 5 Sheets—Sheet 5.

J. R. MORGAN.
OVERHEAD TRAVELING CRANE.

No. 478,803. Patented July 12, 1892.

Witnesses: G. F. Downing, H. G. Nottingham
Inventor: Jno. R. Morgan.
By H. A. Seymour, Atty

UNITED STATES PATENT OFFICE.

JOHN R. MORGAN, OF ALLIANCE, OHIO, ASSIGNOR OF THREE-FOURTHS TO THOMAS R. MORGAN, SR., THOMAS R. MORGAN, JR., AND WILLIAM H. MORGAN, OF SAME PLACE.

OVERHEAD TRAVELING CRANE.

SPECIFICATION forming part of Letters Patent No. 478,803, dated July 12, 1892.

Application filed July 6, 1891. Serial No. 398,631. (No model.)

*To all whom it may concern:*

Be it known that I, JOHN R. MORGAN, of Alliance, in the county of Stark and State of Ohio, have invented certain new and useful Improvements in Overhead Traveling Cranes; and I do hereby declare the following to be a full, clear, and exact description of the invention, such as will enable others skilled in the art to which it appertains to make and use the same.

My invention relates to an improvement in overhead traveling cranes, and particularly to that class of cranes wherein motion is transmitted to the bridge, trolley, and winding-drum by a rotating angular shaft located adjacent to one of the trackways and parallel therewith. This rotating shaft passes through a sleeve or sleeves shaped to fit the shaft, so as to revolve therewith, but free to slide thereon as the bridge moves, the said sleeve being supported in bearings on the bridge and provided with pinions for transmitting the rotary motion of the angular shaft to the driving-wheels of the bridge, trolley, and winding drum or drums. This angular shaft is necessarily approximately the length of the trackway on which the bridge moves, and hence must be supported in boxes at points between its ends. In order, however, to permit the sleeve carrying the toothed wheels which transmit the motion of the angular shaft to the other moving parts and also other parts carried by the bridge to move throughout the length of travel of the bridge without coming in contact with the boxes supporting the angular shaft, it is necessary to make the shaft-supporting boxes movable and provide means for moving them one at a time as the bridge moves on its trackway, so that the sleeves and other parts have clear and unobstructed paths, and also to provide means for restoring the boxes to the normal position after the sleeve and other parts have passed the box.

The invention disclosed in this specification relates solely to the angular shaft-supporting boxes and the means for lowering and raising the same; and it consists in the parts and combinations of parts, as will be more fully described, and pointed out in the claims.

Figure 1:
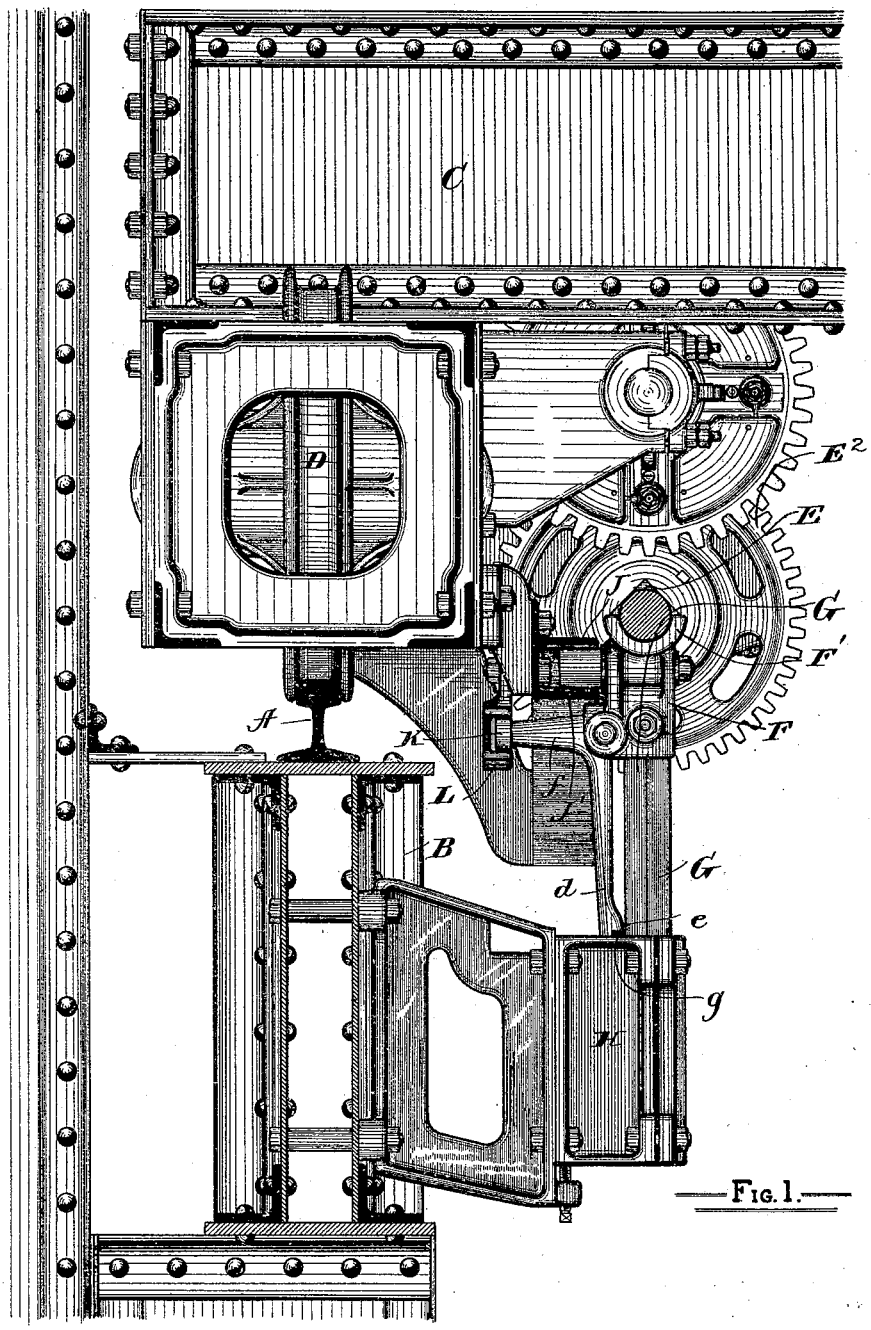
Figure 2:
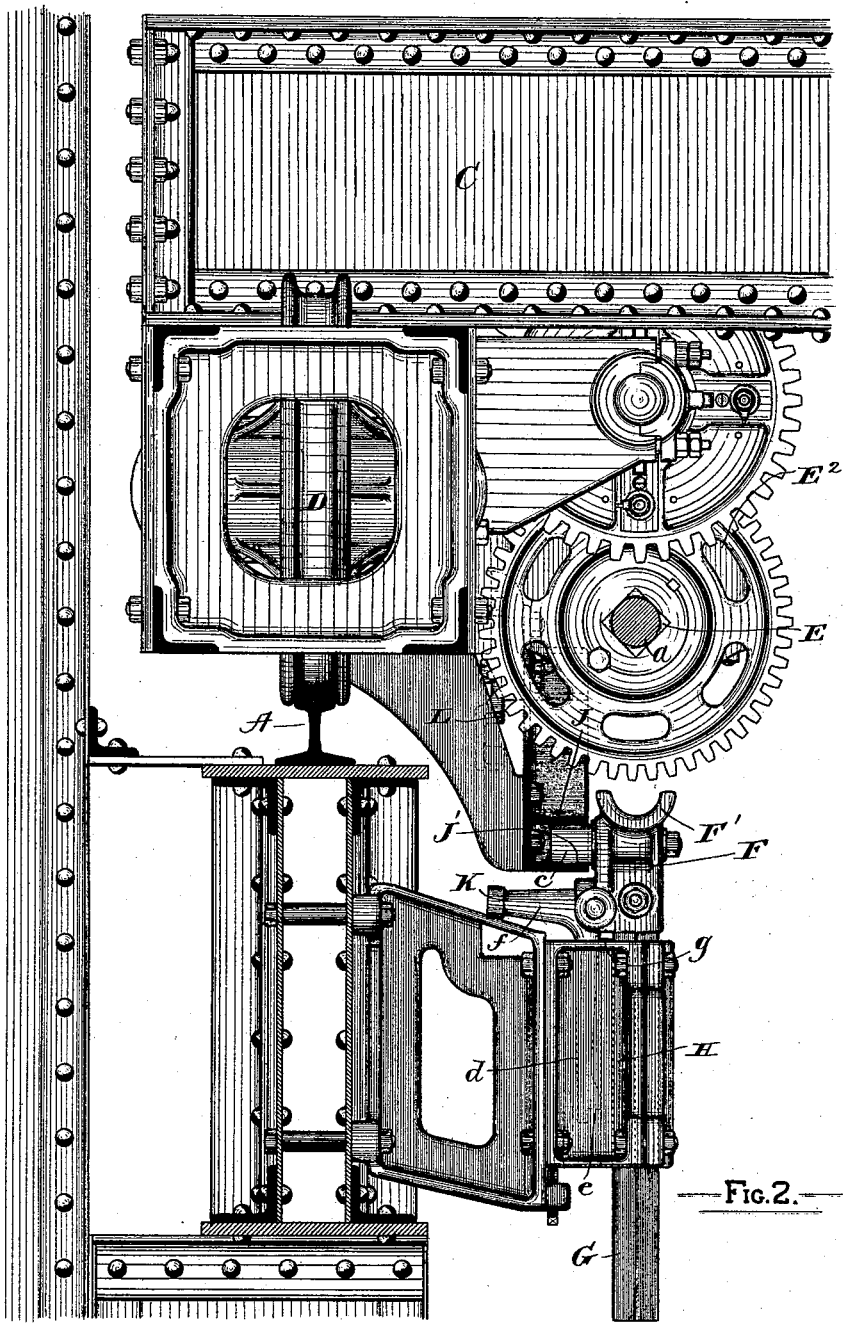
Figure 3:
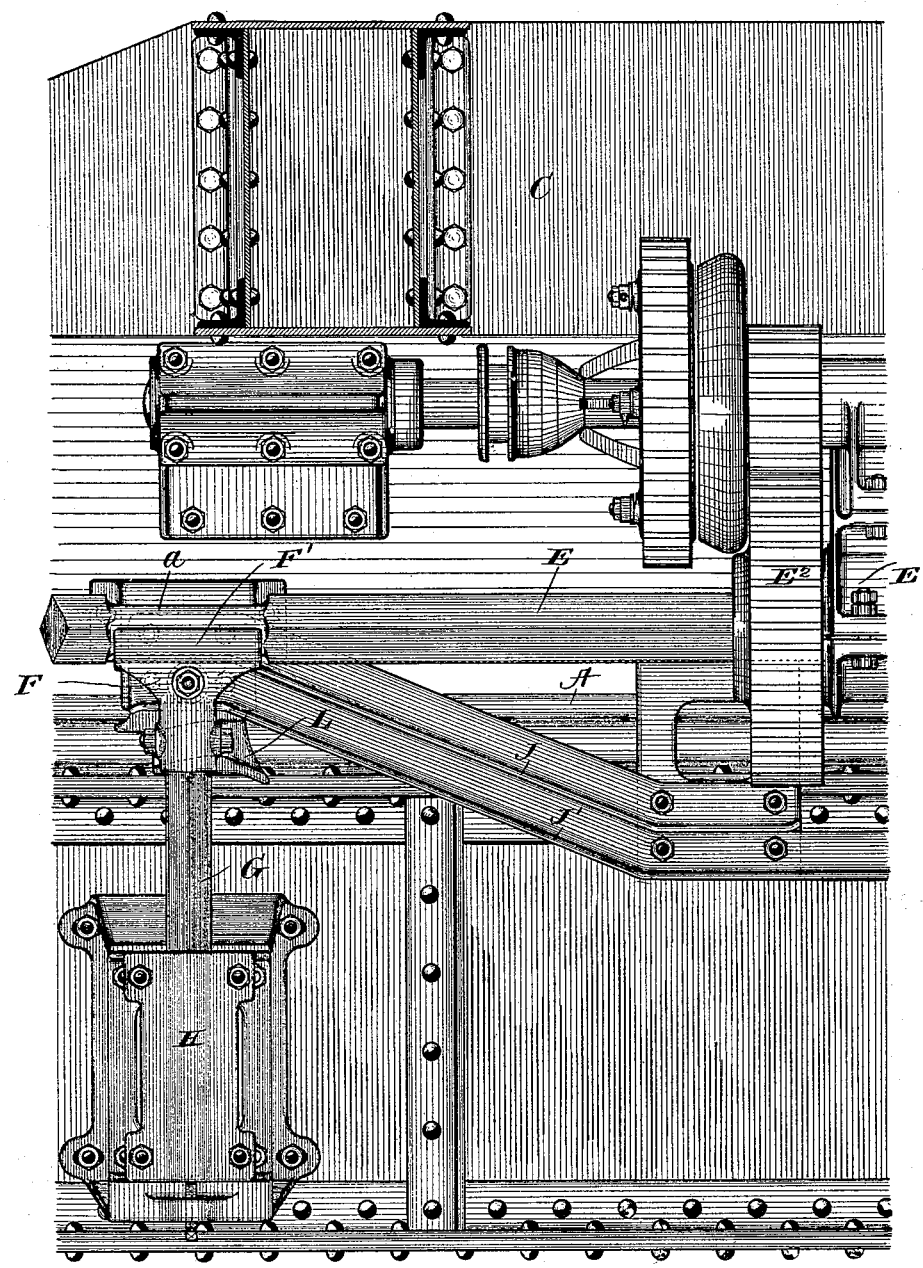
Figure 6:
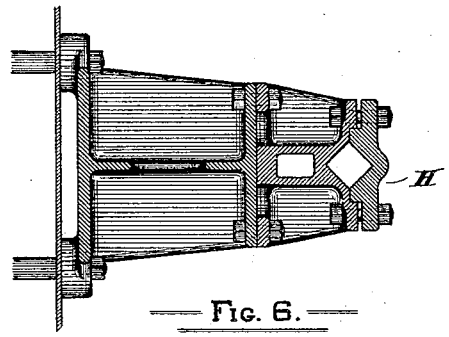
Figure 7:
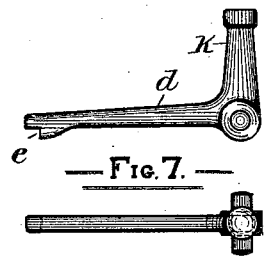
Figure 8:
Figures 9, 10:
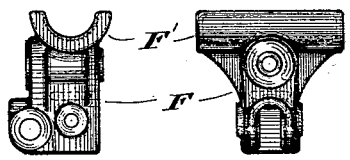
Figure 11:
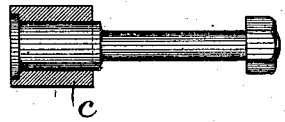
Figure 12:
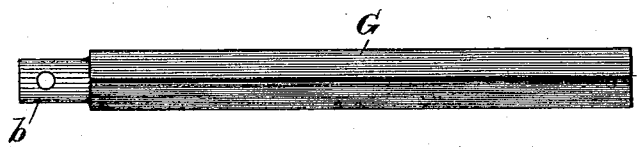
Figure 13:
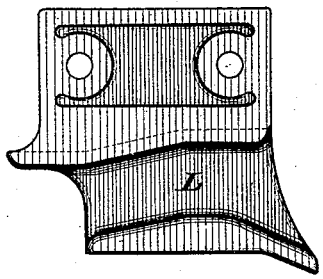
Figure 14:

In the accompanying drawings, Figure 1 is a view in elevation showing one end of the bridge and one track, the bearing and pillar supporting same being elevated. Fig. 2 is a similar view showing the bearing depressed. Fig. 3 is a view in elevation showing the angular shaft and inclines for lowering and elevating the bearings. Fig. 4 is a view in side elevation showing one end of the bridge in dotted lines and the bearing lowering and elevating inclines in full lines. Fig. 5 is a plan view of same. Fig. 6 is a view in horizontal section of the pillar-supporting bracket. Fig. 7 is a view in side elevation, and Fig. 8 an end view of the bell-crank lever for holding the pillar and bearing in their elevated positions. Figs. 9 and 10 are respectively end and side views of the bearing. Fig. 11 is a view of the roller carried by the bearing-box. Fig. 12 is a view of one of the angular pillars, and Figs. 13 and 14 are views in side and end elevation, respectively, of the cam for actuating the bell-crank lever.

A represents a rail or track secured to or on an elevated support, which latter may be secured to the side walls of the building or carried on pillars constructed for the purpose. The trackway A supports one end of the traveling bridge C, the opposite end of said bridge being similarly mounted on another track located at or near the opposite side of the building. The bridge C, which is designed to carry a trolley, is provided at its ends with wheels D, which latter rest and move on the trackways A, motion being imparted to one or more of the wheels at each end of the bridge by gearing driven by the angular shaft E. The driving-shaft E, as shown in Figs. 1, 2, and 3, is preferably square; but in any event it should be angular in order to impart revolution to the sleeve to be hereinafter referred to. This shaft is located near one trackway A and parallel therewith, and is provided at intervals with rounded sections, as shown in dotted lines at $a$, Fig. 4, which rest in the movable bearings. The sleeve which encircles the shaft E is located within the bracket E', Fig. 3, and is rigidly secured to the toothed wheel $E^2$, which latter imparts the motion of the shaft to the moving parts of the device carried on the bridge.

The bearings F are located at intervals to support shaft E and are simply half-bearings, within which the rounded sections of the shaft rest. It would of course be impossible for the bracket E', the sleeve therein, and wheel E² to pass these bearings F while the latter are in their elevated positions and supporting the shaft. Hence it becomes necessary to temporarily displace the bearings as the bridge moves on the trackway. The bearings are secured to the upper cylindrical ends b of the pillars G, (see Fig. 12,) which latter are mounted in the boxes or brackets H. (Shown clearly in Fig. 6.) By making the pillars angular in cross-section and mounting them in correspondingly-shaped brackets all possibility of the bearings turning during their movements is prevented. The bearing is provided on its inner face with a roller c, (shown in detail in Fig. 11,) which latter engages the adjacent faces of the parallel guides J J', located on opposite sides of the sleeve and wheel E². These guides are slightly inclined upwardly at the start, so as to give the pillar and bearing a slight lift as it is first engaged by the guides, after which they incline downwardly, as clearly shown in Figs. 3 and 4.

From the foregoing it will be seen that as the bridge moves along, the roller c, being in line passing between flanges or guides J J', enters the space between said guides, and as the inclination of these guides at the start is slightly upward it follows that the pillar G and bearing are slightly elevated. The purpose of this elevation of the parts will be explained later on. The flanges J J' then incline downwardly a sufficient distance to carry the bearings to a plane below the projections or obstructions on the bridge and immediately undersaid obstructions are horizontal, after which they incline upwardly, so as to elevate the bearings to their positions to support the shaft. The ends of the guideway formed by the flanges are alike. Hence the movements of the bearings and pillars carrying same are alike when engaged by either end of the guideway or flanges. It will be seen at a glance that when the bearing and pillar are released they descend by gravity, the lower flange J' preventing them from descending suddenly, the upper flange J simply acting as guard to force the parts down in the event of a tendency to stick. This being true, the upper flange J can be dispensed with at the horizontal portion or center of guideway, as shown clearly in Fig. 4.

The flanges J J', or plates having these flanges thereon, are securely fastened to the bridge and to brackets depending from the bridge, and as they span or bridge all the parts which could by any possibility engage the bearing it follows that the bearings are lowered and held in such depressed position until the parts which would engage the bearings have passed over the bearing, after which the latter is gradually but positively elevated to its normal position.

K represents the bearing-sustaining device or device for supporting the pillar and bearing thereon in their normal or elevated position and consists of a bell-crank lever pivoted at its elbow to the bearing F. The longer arm d of this lever is provided near its free end with a shoulder e, (see Fig. 7,) adapted to rest on the top of the bracket H and securely hold the pillar and bearing thereon elevated. The shorter arm f of the bearing-sustaining device normally acts as a weight to hold the shoulder e on its seat g, which, as shown in Fig. 2, is slightly inclined to prevent accidental displacement; but in addition to acting as a weight it is also designed to engage the short inclined guides L and move the shoulder e away from its seat g and immediately over a recess or opening in bracket H, and when the parts are in the position last described the pillar and bearing are free to descend.

I have previously stated that the lower guide J' is slightly inclined upwardly at its outer ends for the purpose of giving the pillar and bearing a slight upward movement at the start. This upward movement releases the shoulder e from its seat g and leaves the lever K or pillar-sustaining device free to be rocked. At this stage in the operation of the device the outer end of the shorter arm f of the device K enters the short incline L and moves the longer arm d to a position over or in a vertical plane with the recess or opening in the bracket H, adapted to receive same. By the time the shorter arm leaves the guide L the flanges J J' have started the pillar and bearing downwardly, and during this period the said pillar and bearing thereon are supported solely by the flanges J J'. The guides L are also double-inclined guides. As the roller c on the bearing leaves the guideway formed by flanges J J', the smaller guide L operates to move the shoulder over its seat on the bracket H and hold the bearing and pillar elevated. From the foregoing it will be seen that by this arrangement of parts springs are dispensed with entirely and the movements of the pillar, bearing, and pillar-sustaining device actuated positively by devices carried by the bridge.

It is evident that numerous slight changes might be resorted to in the construction and arrangement of the several parts of the device without departing from the spirit of the invention. Hence I would have it understood that I do not confine myself to the exact construction shown and described, but consider myself at liberty to make such changes and alterations as fairly fall within the spirit and scope of my invention.

Having fully described my invention, what I claim as new, and desire to secure by Letters Patent, is—

1. In a traveling crane, the combination, with a bridge and a revolving shaft for imparting movement to parts on the bridge, of bearings arranged at intervals for supporting the shaft, a bearing-sustaining device for holding the bearing in an elevated position, a double-inclined guideway for lowering and elevating the bearing, and independent devices located near the ends of said guideway for positively releasing and locking said bearing-sustaining device.

2. In a traveling crane, the combination, with a revolving shaft for imparting movement to parts on the bridge, of a series of movable bearings supporting said shaft, means for elevating and lowering the bearings, a bell-crank lever for each bearing, each lever adapted to hold its bearing in an elevated position, and means for actuating said levers, the means for actuating the levers being independent of the means for lowering and elevating the bearings, substantially as set forth.

3. In a traveling crane, the combination, with a revolving shaft, a series of movable bearings supporting said shaft at intervals, and bell-crank levers for locking the bearings in their elevated positions, of a traveling bridge adapted to move in the direction of length of the shaft, a double-inclined guideway carried by the bridge and arranged to receive a projection on the bearing, whereby the bearing is moved first downwardly and then restored to its normal position, and the short guideways located near the ends of the double-inclined guideway for releasing and locking the bell-crank lever.

4. The combination, with a shaft and pillar or support loosely mounted in a bracket and carrying a bearing, of a weighted pivoted lever carried by the pillar and adapted to normally rest on the top of the bracket for holding the pillar and bearing thereon elevated, substantially as set forth.

5. The combination, with a shaft, vertically-movable pillars, half-bearings on the pillars, and brackets in which the pillars move, of a bell-crank lever for each movable pillar, each bell-crank lever adapted to rest with the free end of its vertical arm on a seat at the top of the bracket, the shorter arm acting as a weight to hold said long arm on its seat, substantially as set forth.

6. The combination, with a shaft, a pillar angular in cross-section, a bearing on said pillar, a bracket adapted to receive the angular pillar and permit the latter to slide freely therein, and a bell-crank lever carried by said pillar, the longer arm of said lever adapted to rest on a seat at the top of the bracket and hold the bearing in an elevated position, of a movable bridge and devices carried thereby for moving the pillar and bearing vertically and for rocking the bell-crank lever, substantially as set forth.

In testimony whereof I have signed this specification in the presence of two subscribing witnesses.

JOHN R. MORGAN.

Witnesses:
THOMAS R. MORGAN, Jr.,
FRANK E. DUSSEL.